US012585756B2

(12) United States Patent
Jang et al.

(10) Patent No.: US 12,585,756 B2
(45) Date of Patent: Mar. 24, 2026

(54) APPARATUS FOR REINFORCING SECURITY OF MOBILE TRUSTED EXECUTION ENVIRONMENT

(71) Applicants: THE INDUSTRY & ACADEMIC COOPERATION IN CHUNGNAM NATIONAL UNIVERSITY, Daejeon (KR); KOREA ADVANCED INSTITUTE OF SCIENCE AND TECHNOLOGY, Daejeon (KR)

(72) Inventors: Jinsoo Jang, Daejeon (KR); Brent Byunghoon Kang, Daejeon (KR)

(73) Assignees: The Industry & Academic Cooperation Chungnam National University, Daejeon (KR); Korea Advanced Institute of Science and Technology, Daejeon (KR)

( * ) Notice: Subject to any disclaimer, the term of this patent is extended or adjusted under 35 U.S.C. 154(b) by 454 days.

(21) Appl. No.: 18/261,461

(22) PCT Filed: Jun. 14, 2021

(86) PCT No.: PCT/KR2021/007414
§ 371 (c)(1),
(2) Date: Jul. 13, 2023

(87) PCT Pub. No.: WO2022/154195
PCT Pub. Date: Jul. 21, 2022

(65) Prior Publication Data
US 2024/0078307 A1 Mar. 7, 2024

(30) Foreign Application Priority Data
Jan. 14, 2021 (KR) ........................ 10-2021-0005601

(51) Int. Cl.
*G06F 21/12* (2013.01)
*G06F 21/53* (2013.01)
(Continued)

(52) U.S. Cl.
CPC .............. *G06F 21/53* (2013.01); *G06F 21/54* (2013.01); *G06F 21/78* (2013.01); *G06F 21/121* (2013.01)

(58) Field of Classification Search
CPC .......... G06F 21/53; G06F 21/54; G06F 21/78; G06F 21/121
(Continued)

(56) References Cited

U.S. PATENT DOCUMENTS

| | | | | |
|---|---|---|---|---|
| 7,711,914 B2 * | 5/2010 | Thelen | ................ | G06F 11/0781 717/129 |
| 8,055,828 B2 * | 11/2011 | Conti | ...................... | G06F 13/24 713/320 |

(Continued)

FOREIGN PATENT DOCUMENTS

| | | |
|---|---|---|
| KR | 10-1324693 B1 | 11/2013 |
| KR | 10-1816866 B1 | 1/2018 |

OTHER PUBLICATIONS

Jinsoo Jang et al., "Revisiting the ARM Dbug Facility for OS Kernel Security", DAC '19, Jun. 2-6, 2019, Las Vegas, USA (Year: 2019).*

(Continued)

*Primary Examiner* — Thanh T Le
(74) *Attorney, Agent, or Firm* — You & IP, LLC

(57) ABSTRACT

The present invention relates to an apparatus for reinforcing security of a mobile trusted execution environment, and relates to an apparatus for reinforcing security of a mobile trusted execution environment for constructing a general-purpose trusted execution environment. According to an embodiment of the present invention, a technology available (Continued)

for a general purpose in a mobile device operating on the basis of an ARM architecture has effects of configuring a trusted execution environment for guaranteeing safe execution of an application without depending on an existing commercial security technology, and of configuring a mobile trusted execution environment by using a write area execution prevention function and a debugging watchpoint, which are general-purpose hardware functions.

7 Claims, 5 Drawing Sheets

(51) Int. Cl.
*G06F 21/54* (2013.01)
*G06F 21/78* (2013.01)

(58) Field of Classification Search
USPC ......................................................... 726/22
See application file for complete search history.

(56) References Cited

U.S. PATENT DOCUMENTS

| | | | | |
|---|---|---|---|---|
| 10,108,800 | B1 * | 10/2018 | Surdu | G06F 21/604 |
| 10,255,090 | B2 * | 4/2019 | Tuch | G06F 9/45558 |
| 10,467,410 | B2 | 11/2019 | Lee et al. | |
| 2011/0047542 | A1 | 2/2011 | Dang et al. | |
| 2011/0093723 | A1 * | 4/2011 | Brown | G06F 21/84 |
| | | | | 713/193 |
| 2011/0093750 | A1 | 4/2011 | Williams et al. | |
| 2012/0180050 | A1 | 7/2012 | Manczak et al. | |
| 2014/0372719 | A1 * | 12/2014 | Lange | H04L 63/10 |
| | | | | 711/163 |
| 2015/0052325 | A1 * | 2/2015 | Persson | G06F 12/1433 |
| | | | | 711/163 |
| 2015/0089213 | A1 * | 3/2015 | Isozaki | H04L 9/0891 |
| | | | | 726/17 |
| 2015/0089246 | A1 * | 3/2015 | Kanai | G06F 12/1491 |
| | | | | 713/193 |
| 2015/0220455 | A1 * | 8/2015 | Chen | G06F 12/1408 |
| | | | | 711/163 |
| 2015/0271184 | A1 * | 9/2015 | Josang | H04W 12/086 |
| | | | | 726/22 |
| 2016/0073258 | A1 * | 3/2016 | Fukuoka | H04L 63/105 |
| | | | | 455/411 |
| 2016/0125201 | A1 * | 5/2016 | Villatel | G06F 21/74 |
| | | | | 726/30 |
| 2016/0195919 | A1 * | 7/2016 | Bühler | G06F 1/32 |
| | | | | 713/323 |
| 2016/0299851 | A1 * | 10/2016 | Mattson, Jr. | G06F 12/145 |
| 2016/0378693 | A1 * | 12/2016 | Sasaki | G06F 12/1491 |
| | | | | 711/152 |
| 2017/0060637 | A1 * | 3/2017 | Persson | G06F 21/55 |
| 2018/0239896 | A1 * | 8/2018 | Kato | G06F 12/14 |
| 2018/0248847 | A1 * | 8/2018 | Guri | G06F 9/45558 |
| 2019/0095625 | A1 * | 3/2019 | Surdu | G06F 21/575 |
| 2020/0012820 | A1 * | 1/2020 | Nara | G06F 21/74 |
| 2020/0125772 | A1 * | 4/2020 | Volos | H04L 9/3265 |
| 2021/0026950 | A1 * | 1/2021 | Ionescu | G06F 9/545 |
| 2022/0100673 | A1 * | 3/2022 | Craske | G06F 12/1416 |
| 2022/0405430 | A1 * | 12/2022 | Huh | G06F 18/251 |
| 2023/0281135 | A1 * | 9/2023 | Zhang | G06F 21/53 |
| | | | | 726/26 |

OTHER PUBLICATIONS

Jinsoo Jang et al., 'SelMon: Reinforcing Mobile Device Security with Self-protected Trust Anchor', In: The 18th Annual International Conference on Mobile Systems, Applications, and Services (MobiSys'20), pp. 135-147, Jun. 15, 2020.
Ahmed M. Azab et al., "SKEE: A lightweight Secure Kernel-level Execution Environment for ARM", In 23rd Annual Network and Distributed System Security Symposium, NDSS 2016, San Diego, California, USA, Feb. 21-24, 2016, pp. 1-15.
Yeongpil Cho et al., "Dynamic Virtual Address Range Adjustment for Intra-Level Privilege Separation on ARM", In 24th Annual Network and Distributed System Security Symposium, NDSS 2017, San Diego, California, USA, Feb. 26-Mar. 1, 2017, pp. 1-15.
Nathan Dautenhahn et al., "Nested kernel: An operating system architecture for intrakernel privilege separation", In ACM SIGPLAN Notices, vol. 50. ACM, pp. 191-206.
Jinsoo Jang et al. "Revisiting the ARM Debug Facility for OS Kernel Security", DAC '19, Jun. 2-6, 2019, Las Vegas, NV, USA.
Yutao Liu et al., "Thwarting Memory Disclosure with Efficient Hypervisor-enforced Intra-domain Isolation", CCS'15, Oct. 12-16, 2015, Denver, Colorado, USA.

* cited by examiner a) Nested Kernel (x86)                                b) SKEE (ARM)

c) Hilps (ARM)

APPARATUS FOR REINFORCING SECURITY OF MOBILE TRUSTED EXECUTION ENVIRONMENT

TECHNICAL FIELD

The present disclosure relates to an apparatus for reinforcing security of a trusted execution environment in a mobile device and, more particularly, to an apparatus for reinforcing security of a trusted execution environment in a mobile device to create a general-purpose trusted execution environment.

BACKGROUND ART

Together with the development of Internet of Things (IoT) technology, threats to security are also increasing. IoT refers to technology that wirelessly connects to the Internet by communication features embedded in smartphones, home networks, automobiles, and various IT devices. As the IT devices mentioned here are exposed to the outside through the Internet, eventually there is a possibility that all objects may become targets of hacking.

One of the technologies presented against such increasing security threats is ARM's TrustZone. Such ARM TrustZone is a technology that provides two separate environments in one device to safely protect information requiring security in an isolated environment.

Conventionally, a commercial security technology called ARM TrustZone has been used, but there is a problem that it is difficult to create a trusted execution environment in a low-end device, which does not provide such ARM Trust-Zone technology.

RELATED ART DOCUMENTS

Patent Documents (Patent Document 1) Korea Patent No. 10-1324693 (Oct. 28, 2013)

Non-Patent Documents (Non-Patent Document 1) Ahmed M. Azab, Kirk Swidowski, Rohan Bhutkar, Jia Ma, Wenbo Shen, Ruowen Wang, and Peng Ning. 2016. SKEE: A lightweight Secure Kernel-level Execution Environment for ARM. In 23rd Annual Network and Distributed System Security Symposium, NDSS 2016, San Diego, California, USA, Feb. 21-24, 2016.

(Non-Patent Document 2) Yeongpil Cho, Donghyun Kwon, Hayoon Yi, and Yunheung Paek. 2017. Dynamic Virtual Address Range Adjustment for Intra-Level Privilege Separation on ARM. In 24th Annual Network and Distributed System Security Symposium, NDSS 2017, San Diego, California, USA, Feb. 26-Mar. 1, 2017.

(Non-Patent Document 3) Nathan Dautenhahn, Theodoros Kasampalis, Will Dietz, John Criswell, and Vikram Adve. 2015. Nested kernel: An operating system architecture for intrakernel privilege separation. In ACM SIGPLAN Notices, Vol. 50. ACM, 191-206.

DISCLOSURE

Technical Problem

The present disclosure has been devised to solve the above-described problems, and an objective of the present disclosure is to provide an apparatus for reinforcing security of a trusted execution environment in a mobile device, the apparatus enabling a trusted execution environment to ensure safe execution of applications without depending on existing commercial security technologies.

In addition, another objective of the present disclosure is to provide an apparatus for reinforcing security of a trusted execution environment in a mobile device, the apparatus configuring the trusted execution environment in the mobile device by leveraging features of debugging watchpoints and write area execution prevention, which are general-purpose hardware features.

Technical Solution

According to one aspect of the present disclosure, there is provided an apparatus for reinforcing security of a trusted execution environment in a mobile device, the apparatus including: a hypervisor configured to separate regions into a privileged region and a non-privileged region; a region switch unit configured to perform switching between the privileged region and the non-privileged region by controlling a watch point and memory execution area write protection; and a mode switch unit configured to perform switching between OS kernel mode and hypervisor mode through trapping by branch depending on an exception occurrence privilege in order to protect vector integrity.

Meanwhile, there is provided a method for reinforcing security of a trusted execution environment in a mobile device, the method including: trapping a hypercall exception by an exception vector in a privileged region when a hypercall, which is ported for OS kernel monitoring, is invoked from an OS kernel; checking an OS request type to dispatch a handler in a non-privileged region and causing a region switch to occur from the privileged region to the non-privileged region; and performing switching between the privileged region and the non-privileged region through a secure gate that configures a watch point and a memory execution area write protection (DEP) flag in order to isolate the privileged region.

Advantageous Effects

According to an exemplary embodiment of the present disclosure, the embodiment is a technology applicable for general purposes in mobile devices that operate based on the ARM architecture, whereby there is an effect of configuring a trusted execution environment to ensure safe execution of applications without depending on existing commercial security technologies, and also there is an effect of configuring a trusted execution environment in a mobile device by leveraging features of debugging watchpoints and write area execution prevention function, which are general-purpose hardware features.

BEST MODE

Specific structures and functional descriptions presented in exemplary embodiment of the present disclosure are exemplified for the purpose of describing the exemplary embodiment according to a concept of the present disclosure only, and the exemplary embodiments according to the concept of the present disclosure may be implemented in various forms. In addition, it should not be construed as being limited to the exemplary embodiments described herein, and should be understood to include all modifications, equivalents, and substitutes included in the idea and technical scope of the present disclosure.

Meanwhile, in the embodiment of the present disclosure, it will be understood that, although the terms "first", "second", etc. may be used herein to describe various components, these components should not be limited by these terms. The terms are only used for the purpose of distinguishing one component from other components. For instance, within a scope not departing from the scope of rights according to the concept of the embodiment of the present disclosure, a first component may be referred to as a second component, and similarly, the second component may also be referred to as the first component.

Hereinafter, the exemplary embodiment of the present disclosure are described with reference to the accompanying drawings. In describing the exemplary embodiment of the present disclosure, when it is determined that a description of a related known function or configuration may unnecessarily obscure the gist of the present disclosure, the description is omitted.

Figure 1:
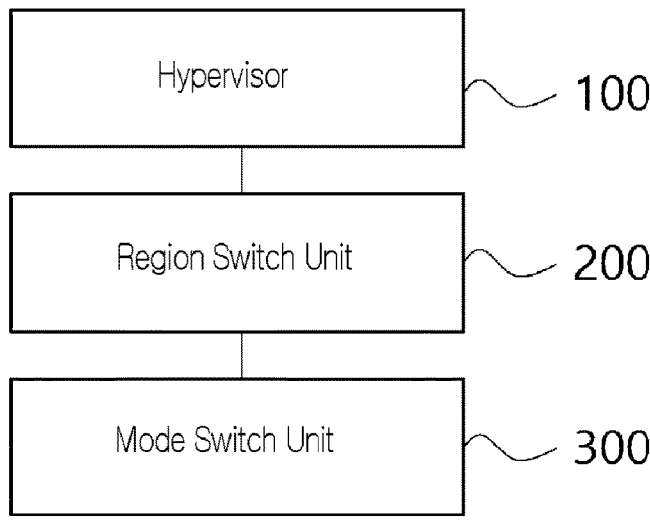
FIG. 1 is a schematic view illustrating an apparatus for reinforcing security of a trusted execution environment in a mobile device according to an exemplary embodiment of the present disclosure.

FIG. 1 is a schematic view illustrating an apparatus for reinforcing security of a trusted execution environment in a mobile device according to an exemplary embodiment of the present disclosure. As shown in FIG. 1, the apparatus for reinforcing the security of the trusted execution environment in the mobile device according to the exemplary embodiment of the present disclosure includes a hypervisor 100, a region switch unit 200, and a mode switch unit 300.

The hypervisor 100 is configured with regions separated into a privileged region and a non-privileged region.

Here, in the privileged region, writable objects such as page tables are protected as privileged data. In addition, in the privileged region, an exception vector and a privileged region code are separated based on a granularity of page. In the non-privileged region, updates of the page tables and system registers are emulated for a monitored OS kernel.

The region switch unit 200 is a component that performs switching between the privileged region and the non-privileged region by controlling watch points and memory execution area write protection. Such a region switch unit checks an OS request type in an exception vector. In addition, the region switch unit switches the regions through a secure gate that configures a watch point and a memory execution area write protection (i.e., DEP) flag in order to isolate the privileged region. In addition, upon receiving a request for updating a hypervisor page table while executing the non-privileged region, the region switch unit performs switching to the privileged region by using a hypercall captured by the exception vector.

The mode switch unit 300 is a component configured to perform switching between OS kernel mode and hypervisor mode through trapping by branch depending on an exception occurrence privilege in order to protect vector integrity. According to such a mode switch unit, a hypercall triggered in the OS kernel is trapped by a branch due to an exception with a lower privilege. In addition, all exceptions that occur in hypervisor mode execution are trapped by a branch for a current privilege.

Figure 2:
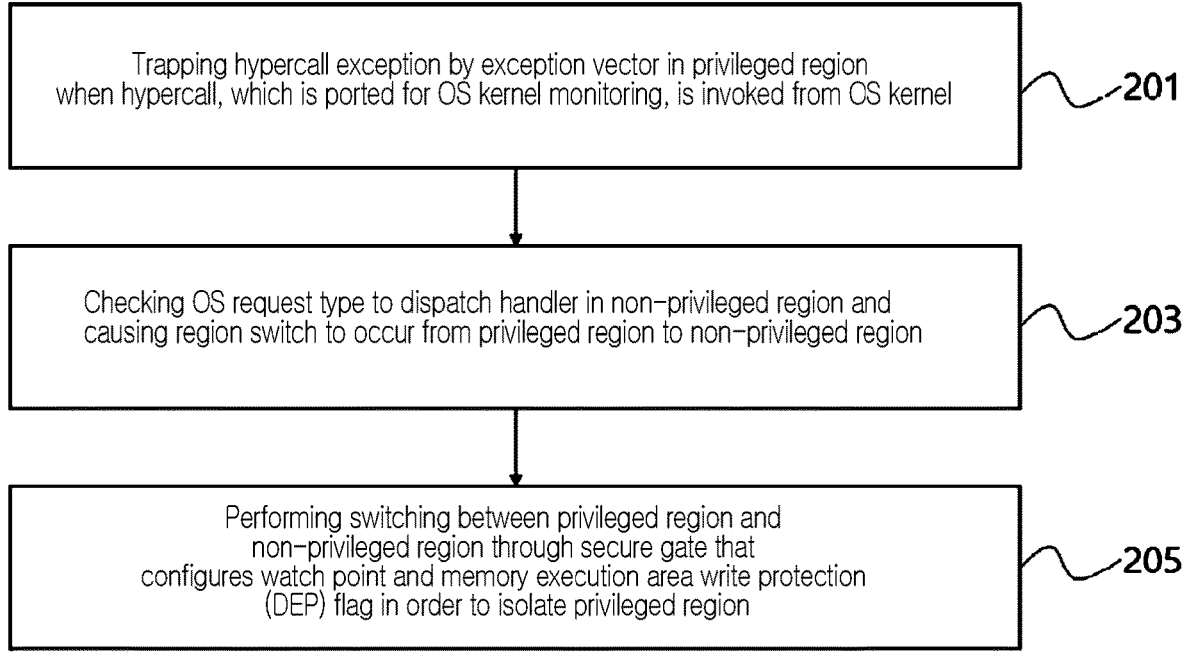
FIG. 2 is a flowchart illustrating a method for reinforcing security of a trusted execution environment in a mobile device according to the exemplary embodiment of the present disclosure.

Meanwhile, according to the exemplary embodiment of the present disclosure, as shown in FIG. 2, a method for reinforcing security of a trusted execution environment in a mobile device includes: step 201 of trapping a hypercall exception by an exception vector in a privileged region when a hypercall, which is ported for OS kernel monitoring, is invoked from an OS kernel; step 203 of checking an OS request type to dispatch a handler in a non-privileged region and causing a region switch to occur from the privileged region to the non-privileged region; and step 205 of performing switching between the privileged region and the non-privileged region through a secure gate that configures a watch point and a memory execution area write protection (DEP) flag in order to isolate the privileged region.

Hereinafter, the apparatus for reinforcing the security of the trusted execution environment in the mobile device according to the exemplary embodiment of the present disclosure is described in detail.

According to the exemplary embodiment of the present disclosure, higher privileged trust anchors such as thin hypervisors and Trust-Zone have been adopted to protect mobile OSs. For example, a Samsung Knox security platform implements a kernel integrity monitor on the basis of a hardware-assisted virtualization technique for 64-bit devices. Although the kernel integrity monitor protects the OS kernel integrity, the monitoring platform itself may be a target of attackers when the kernel integrity monitor contains exploitable bugs. In this regard, the apparatus for reinforcing the security of the trusted execution environment in the mobile device according to the exemplary embodiment of the present disclosure proposes a method of protecting the kernel integrity monitor without introducing the higher privileged trust anchors. To this end, first, regions of the integrity monitor are logically separated into a privileged region and a non-privileged region.

Thereafter, in the apparatus for reinforcing the security of the trusted execution environment in the mobile device, only a privileged region code is allowed to access critical data objects (e.g., a hypervisor page table) that may be exploited to compromise the monitor integrity. In the exemplary embodiment of the present disclosure, non-critical operations in terms of preserving the monitor integrity are performed in the non-privileged region. In addition, in the exemplary embodiment of the present disclosure, other than the separation of privileged and non-privileged regions, a method of ensuring the robustness of the separation of privileged and non-privileged regions by using general hardware features, that is, the watchpoint and Data Execution Prevention (DEP), will be described.

The apparatus for reinforcing the security of the trusted execution environment in the mobile device according to the exemplary embodiment of the present disclosure may construct trust anchor-based security facilities by supporting privileged hardware features such as hardware-assisted hypervisors and TrustZone. The apparatus for reinforcing the security of the trusted execution environment in the mobile device the present exemplary embodiment uses TrustZone to protect mobile OS kernel integrity on 32-bit mobile devices. Meanwhile, on a 64-bit architecture, the Samsung Knox platform utilizes the hardware-assisted hypervisor as a trust anchor to ensure kernel integrity.

Regardless of whether the hypervisor or TrustZone is used or not, the kernel integrity protection is performed in a similar method in which the OS is deprivileged and updates of system registers and page tables, and the like as security-critical operations of the OS are verified. Emulation is performed by such trust anchors. The delegation of OS kernel operations generates some channels for continuous interaction between the OS and the trust anchors, the channels being abused by attackers who find and exploit vulnerabilities of the trust anchors.

To solve this problem, the present disclosure proposes a trust anchor self-protection mechanism (i.e., SelMon) that does not require other higher privileged components for trust anchor protection. Through such SelMon, the hypervisor-based kernel integrity monitor is enhanced, thereby demonstrating the feasibility of this approach. According to the proposed exemplary embodiment of the present disclosure, the virtual separation of monitor privileges and the utilization of general hardware features are the key points. The monitor is logically separated into a privileged region and a non-privileged region. The non-privileged region performs non-critical and fundamental operations for monitoring the OS kernel, such as updating kernel system registers. Whereas, the privilege region manages predefined critical operations closely related to monitor security. For example, page tables may be abused to manipulate the monitor. Accordingly, updating a page table is defined as one of the security-critical operations restrictively performed in the privileged region.

In the apparatus for reinforcing the security of the trusted execution environment in the mobile device according to the exemplary embodiment of the present disclosure, the privileged region should be neither accessible nor executable for proper protection while the non-privileged region is activated. In addition, for the non-accessibility enforcement, the present exemplary embodiment uses a watchpoint, which is a hardware debugging feature. In addition, in the present exemplary embodiment, watchpoint monitoring to the entire privileged region is enabled so as to prevent any non-privileged code to perform malicious modification in an entry for the non-privileged region. In addition, in the present exemplary embodiment, hardware support for Data Execution Prevention (DEP) is used to prevent arbitrary execution of a privileged region code. In addition, in the present exemplary embodiment, privileged code is mapped to writable pages and DEP is enabled when a switch to the non-privileged region occurs. Here, due to non-accessibility guaranteed by the watchpoint configuration, this region remains immutable during non-privileged code execution. Finally, switches between the regions should be managed in a deterministic way. To this end, entry gates to respective regions, the entry gates handling the above-described configuration based on the region switches, are designed.

The thin hypervisor that performs OS kernel integrity protection is hardened with SelMon to demonstrate the feasibility of the present approach. The hardware-supported DEP and one of four debug watchpoints are used to isolate a privilege from the non-privileged region. The apparatus for reinforcing the security of the trusted execution environment in the mobile device, which aims to protect a trust anchor (i.e., privileged software) running on high-end mobile devices, does not require higher privileged software or hardware components other than the general hardware features such as the watchpoint and Data Execution Prevention (DEP), In the apparatus for reinforcing the security of the trusted execution environment in the mobile device according to the present exemplary embodiment, watchpoints and DEP are supported in kernel mode. Accordingly, in a case where the trust anchor is not available, the apparatus may be adapted to self-protect the OS. In addition, other architectures that support similar hardware features may leverage the approach of the trust anchor self-protection mechanism, which does not require other higher privileged components for the trust anchor protection.

ARM Processor Security State

In security, processor security states may be separated into a secure state and a non-secure state through Architecture Reference Manual (ARM) security extension. In the secure state, user mode, kernel mode, and monitor mode are available. In the non-secure state, user mode, kernel mode, and hypervisor mode are supported. The secure state is configured using a non-secure (NS) flag in a secure configuration register (SCR_EL3). For example, when the NS flag is set, a current secure state is in non-secure. The processor security configuration is performed in the monitor mode introduced to handle the switches between the secure state and the non-secure state. In general, this separation of processor security states may be leveraged together with TrustZone technology for isolating a critical memory region and peripherals, thereby creating a Trusted Execution Environment (TEE).

ARM Hardware-assisted Virtualization

The key features of virtualization in terms of building security application may be classified into two types: (1) secondary paging and (2) hypervisor trap. The secondary paging fundamentally aims to translate an intermediate physical address (i.e., a physical address of a virtual machine) into a real machine address. This feature is mainly used to isolate or protect a specific memory region from other regions by generating a secondary page table. For example, hypervisor-based kernel integrity monitors protect a kernel text region by setting a read-only permission of the secondary pages that map a text.

A hypervisor trap configuration facilitates the monitoring of security-critical operations, which are required to be verified or emulated by the hypervisor. The virtual memory configuration in the OS kernel is trapped and verified by a security hypervisor.

Hardware Debugging Support

In addition to debugging through external hardware (e.g., a JTAG debugger), commercial processors such as ARM and x86 are configured to support hardware debugging features that allow the privileged software to trap and handle debugging exceptions. For example, when a hardware breakpoint is set at a particular address, a breakpoint exception may be generated when an instruction for the address is executed. The exception is trapped by the privileged software such as an OS kernel. Whereas, a watchpoint may be used to monitor data access in a similar way.

When data access (i.e., read or write) to a region monitored by a watchpoint occurs, a watchpoint exception is generated, trapped, and handled by the privileged software. In the present exemplary embodiment, access to a memory region critical for security is monitored using the watch point. For reference, a breakpoint is applied in a way to start debugging from a particular line, whereas a watchpoint is used in a way to start debugging from a specific value of a particular field. The following properties of watch points are utilized.

Table 1 is an example configuration for generating watchpoint exceptions in a non-secure state and a secure state, and Table 2 represents control flag settings for debug exception routing.

TABLE 1

| SSC | PAC | Security state | Watchpoint for |
|-----|-----|----------------|----------------|
| 01 | 10 | Non-secure | User |
| 01 | 01 | Non-secure | Kernel |
| 11 | 00 | Non-secure | Hypervisor |
| 10 | 10 | Secure | User |
| 10 | 01 | Secure | Kernel |

TABLE 2

| | Privilege level where debug exception is generated | | |
|---|---|---|---|
| | User | Kernel | Hypervisor |
| Settings | Privilege level that handles the exception | | |
| NS = 1, TDE = 0 | Kernel | Kernel | Hypervisor* |
| NS = 1, TDE = 1 | Hypervisor | Hypervisor | Hypervisor |
| NS = 0, TDE = × | Kernel | Kernel | N/A |

*Breakpoint instruction exception only

In the watchpoint exception generation, watchpoint exceptions generated in a certain processor mode may be set by configuring watchpoint control flags. For example, as shown in Table 1, in the watchpoint exception generation, exceptions may be generated in hypervisor mode by respectively setting, to 0b11 and 0b00, a Security State Control (SSC) flag and a Privileged Access Control (PAC) flag in a Debug Watchpoint Control Register (DBGWCR). Depending on a Secure State Control (SSC) value, the watchpoint exceptions may also be generated in TEE (the secure state). When the SSC value is set to 0b10, exceptions may be generated in user mode or kernel mode in the TEE.

As shown in Table 2, when the processor mode is in a non-secure state, watchpoint exception routing may be handled in the kernel or hypervisor depending on a Trap Debug Exception (TDE) flag of a Monitor Debug Configuration Register (MDCR_EL2). For example, in a watchpoint exception, the TDE flag should be set to trap the watchpoint exception in the hypervisor mode. Whereas, when a processor is in TEE (the secure state, i.e., NS=0), an exception is trapped and handled by the kernel mode (the secure OS) at all times.

In watchpoint configuration requirement, a maximum size of watchpoint monitoring in the ARM 64-bit architecture (ARMv8) is 2 GB. The size should be aligned to a power of 2. The Debug Watchpoint Control Register (DBGWCR) may configure a monitoring size by using mask flags. In addition, a monitoring start address should be aligned to a monitoring size. For example, when the monitoring size is 4 KB, a monitoring start address should be aligned to 4 KB.

The starting address may be configured in the Debug Watchpoint Value Register (DBGWVR).

In addition, in the watchpoint configuration requirement, in addition to the size and address configuration, several control flags are required to be set when to activate watchpoint monitoring. First, an enable flag in DBGWCR is required to be set. Second, a Kernel Debug Enable (KDE) flag should be set to generate a watchpoint exception in the same mode in which the exception is handled. For example, in order to self-manage watchpoint exceptions in the hypervisor mode, the KDE and TDE flags are required to be set. Finally, a debug exception mask flag D in a process state (PSTATE) is required to be cleared. When an exception occurs, this flag is automatically set to disable the debug exception generation.

Kernel Integrity Monitor

Trust anchors such as TrustZone and hypervisor are used to implement kernel integrity monitors. The TrustZone-based TEE on 32-bit devices locate the integrity monitor. In the newest mobile devices based on 64-bit ARM architecture, hardware-assisted virtualization monitoring is leveraged to enable monitoring.

Meanwhile, regardless of locations where the integrity monitor is deployed, the monitors apply the following security properties. First, page tables are not allowed to be updated by the kernel. After security verification, only the integrity monitor may emulate the update. In this way, memory protection is ensured. Second, the kernel is not allowed to configure security-critical system registers. Similar to the memory protection, the critical system registers are updated merely by the monitor. In this way, the monitor is prevented from being invoked synchronously and maliciously reconfiguring system settings, such as disabling a Memory Management Unit (MMU) or remapping a page table. Original kernel operations for such an update are replaced with a trust anchor invocation such as a hypercall.

In order to separate software privileges and safely execute critical operations, privilege separation creates an isolated execution environment in the OS kernel by leveraging memory translation-related features. A system-wide memory WP is leveraged to isolate critical operations of the OS and hypervisor. Such approaches enable intra-region privilege separation, but are adoptable in a limited way to the trust anchor protection in the ARM architecture.

For monitoring the critical operations, the privilege separation verifies and emulates the OS kernel's critical operations such as page table updates. In addition, the privilege separation provides a virtual instruction-based abstraction layer for monitoring OS behaviors. In this way, the control flow of OS is protected and applications are protected. In addition, the privilege separation protects application programs protected from side-channel attacks conducted by malicious OSs. In addition, the privilege separation redesigns a monolithic hypervisor (e.g., KVM) to isolate a small trusted corevisor from a large untrusted hostvisor. The isolation is applied by using secondary paging and by running compartments (the corevisor and hostvisor) in CPU modes (i.e., the hypervisor and kernel, respectively) having respective privileges different from each other.

The apparatus for reinforcing the security of the trusted execution environment in the mobile device according to the present exemplary embodiment proposes a different approach of effectively isolating security artifacts without adopting an additional trusted layer and providing an additional option accordingly when the layer is unavailable.

In mobile device security, security application programs for mobile devices are implemented by leveraging various hardware features. Sensitive data and code is stored in an ARM SoC instead of DRAM to prevent cold boot attacks. In addition, hardware-based fault isolation is enabled by using a memory domain and a Domain Access Control Registers (DACR). In addition, an Execute Only Memory (XOM) is enabled through hardware support of ARMv8. As an example of the mobile device security, the apparatus for reinforcing the security of the trusted execution environment in the mobile device according to the present exemplary embodiment may provide TEE to third-party developers by using TrustZone as a security extension for an ARM processor. In addition, one-time password tokens is protected by using TrustZone. In addition, a part of an application program is protected based on the isolation provided by Trust-Zone. Finally, TrustZone is virtualized to provide TEE to individual virtual machines.

The present exemplary embodiment assumes the presence of a trust anchor that monitors kernel integrity and is built as a thin hypervisor. The monitor protects the OS kernel as previously described in the kernel integrity monitor. That is, the OS kernel is deprived of the authority of performing security-critical operations such as updating of page tables and system registers. Instead, the monitor is responsible for verification and emulation of such operations. However, the monitor (hypervisor) itself may be compromised by an attacker. In particular, the monitor itself may contain vulnerabilities that cause granting attackers the ability for arbitrary memory access and control flow hijacking. With an escalated privilege, the attacker may attempt to manipulate the monitor to perpetuate his or her attack, and critical hypervisor components such as page tables and system configuration registers may be abused. The approach of the present exemplary embodiment aims to harden the hypervisor in such a way that the integrity of the critical components of the hypervisor is protected even in the presence of the vulnerabilities.

As described above, the integrity monitor itself may be vulnerable to attacks. As a fundamental step for enhancing the monitoring platform security, the present exemplary embodiment aims to self-protect trust anchors running in the hypervisor mode and the secure (and non-secure) kernel modes. The key to the present exemplary embodiment is to realize the privilege separation of software, which is executed monolithically having the same privilege. In particular, due to the benefit of hardware support of watchpoint and DEP, the apparatus for reinforcing the security of the trusted execution environment in the mobile device according to the present exemplary embodiment does not depend on higher privileged hardware and software components.

Figure 3:
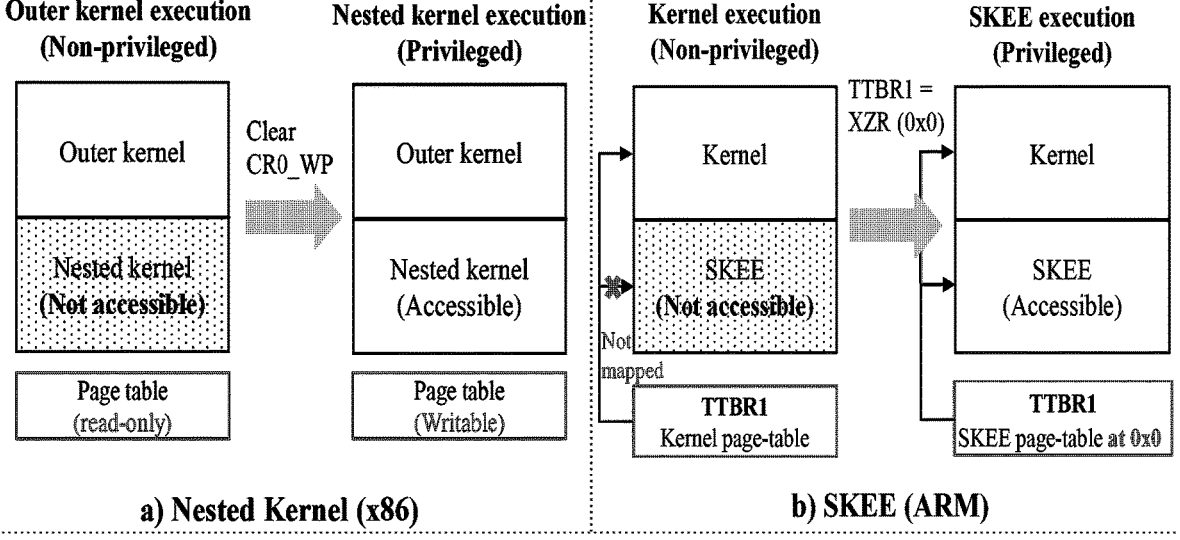
FIG. 3 is a view illustrating a self-protection approach.
Figure 3:
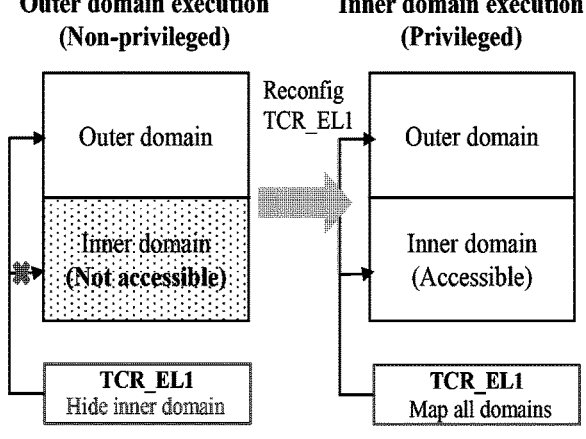

FIG. 3 is a view illustrating a self-protection approach. As shown in FIG. 3, three of self-protection approaches (i.e., nested kernel, SKEE, and Hilps) separate software privileges without depending on the higher privileged components.

The three approaches first separate the system into two compartments, i.e., privileged and non-privileged regions, on the basis of whether security-critical operations such as updating page tables are performed or not. In the code that handles the entry to and exit from the privileged region, gates particularly manage a system configuration that dominates the robustness of the proposed approaches. Accordingly, the feasibility of each approach is analyzed by verifying whether gate design is generally applicable to protect the privileged software on ARM.

Listing 1 below is a part of the gate code for a nested kernel, which configures a WP bit in CR0.

```
(Listing 1)

1 entry :
2......
3 mov % cr0, %rax //Get current CR0 value (Get current CR0 value)
4 and ~CR0__WP, %rax //Clear WP bit in copy (Clear WP bit in copy)
5 mov %rax, %cr0 //Write back to CR0 (Write back to CR0)
6 cli //Disable interrupts (Disable interrupts)
7......
- Nested Kernel -
```

The nested kernel applies a read-only permission for all objects in order to protect critical kernel objects such as page tables. Then, the nested kernel turns off the system-wide read-only settings by using the WP bit in CR0, so as to enable a privileged part to update the objects. As can be seen in lines 3 to 5 of Listing 1, write protection is disabled in an entry for the privileged region (and vice versa at an exit from the privileged region). The ARM architecture does not provide such a control bit configurability (i.e., WP). Page table attributes are always applied as long as the MMU is enabled.

Listing 2 below is a part of SKEE gate code that configures a TTBR value by using a zero register (xzr).

```
(Listing 2)

1......
2 msr DAIFset,0x3 // Mask all interrupts (Mark all interrupts)
3 mrs x0,ttbr1__el1 // Read existing TTBR1 value (Read existing TTBR1 value)
4 str x0,[sp, #-8]! // Save existing TTBR1 value (Save existing TTBR1 value)
5 msr ttbr1__el1,xzr // Load Zero to TTBR1 (Load Zero to TTBR1)
6 isb
7 tlbi vmalle1 // Invalidate the TLB (Invalidate TLB)
8 isb
9......
- SKEE -
```

Because of no WP configuration support on ARM, SKEE uses a different approach. SKEE prepares two page tables different from each other for a privileged region and a non-privileged region. Only the page table for the privileged region has a mapping to that region, whereby activation is allowed in the entry for the privileged region. This approach for switching the page table during region switches has a weak point that a gate may be exploited to map a malicious page table by executing an instruction that updates the TTBR. To solve this problem, SKEE, which deterministically switches the TTBR, locates the page table for the privileged region in a constant address 0x0 and uses a zero register XZR in a TTBR update as shown in Listing 2. In a case where the address 0x0 is not available, the present exemplary embodiment recommends to use the virtualization technique (i.e., the secondary paging) whenever possible to remap a specific memory region to 0x0 from a perspective of the kernel. Depending on device implementation, the address 0x0 may be reserved for hardware peripherals. For example, since a Juno development board arranges a Boot ROM at 0x0, the memory is required to be remapped when to activate SKEE in the Juno board. The additional translation layer (i.e., the secondary paging) is not supported in the hypervisor mode and the kernel mode in the secure state (i.e., the TEE kernel).

Listing 3 below is a part of Hilps gate code that configures a Translation Configuration Register (TCR). Listing 3 validates flags for a virtual address range and a page size.

---

(Listing 3)

```
1......
2 1:
3 mrs x5,tcr_el1 // Read the current TCR
4 and x5,x5, # 0xffffffffffdffff // Set T1SZ flags
5 orr x5,x5, # 0x400000
6 msr tcr_el1,x5 //Configure TCR
7 isb
8
9 mov x6,# 0xc03f // Check the TCR setting
10 mov x7,# 0x1b //(1) virtual address range
11 movk x6,# 0xc07f,lsl #16 // and (2) trans. granule size
12 movk x7,# 0x8059,lsl #16
13 and x5,x5,x6
14 cmp x5,x7
15 b.ne 1b // If invalid, configure TCR again
16......
- Hilps -
```

---

As shown in Listing 3, Hilps leverages a TxSZ field of the TCR. The range of a virtual address may be adjusted by configuring TxSZ. By dynamically changing the virtual address range, a particular virtual address region may be hidden instantly. By using this, Hilps hides the privileged region during non-privileged region execution. This approach may be potentially vulnerable when an attacker abuses a TCR update instruction in line 6 of Listing 3. This is because not only the virtual address range is adjustable but also a translation granule size is adjustable by configuring a translation granule (TGx) field. On the ARM 64-bit architecture, the translation granule sizes of 4 KB, 16 KB, and 64 KB determine an index size of walking page tables as well as a minimum page size. For example, the 4 KB granule uses a 9-bit slice of a virtual address as an index, whereas the 16 KB granule uses an 11-bit slice. The 4 KB granule allows for 1 GB, 2 MB, and 4 KB page sizes, but depending on the level of page tables, 32 MB and 16 KB pages may be used together with the 16 KB granule. Accordingly, the page table entries and the number of the entries for walking a specific range of virtual addresses are determined by a translation granule size. That is, changing a granule size may result in undeterministic behavior because the specific virtual address may be translated by different page table entries. The attacker may exploit this weak point to execute arbitrary and unintended instructions. For example, in Listing 3, in a case where validation logic (lines 9 to 14) is provided in a boundary of a 4 KB-sized page different from a preceding code (lines 1 to 7), the granule size configuration is changed from 16 KB to 4 KB, (or vice versa) may undeterministically bypass the validation depending on system status (e.g., cache conditions and sparse physical memory allocation).

System Design

Before describing the system design, contents thereof will be described in order as follows: (5.1) Trust anchor self-protection mechanism (SelMon) that does not require other higher privileged components for trust anchor protection, (5.2) Security-critical objects, (5.3) Privilege separation, (5.4) Privileged region protection, (5.5) Region switch, and (5.6) Compatibility with debugging activities.

In (5.1), the apparatus for reinforcing the security of the trusted execution environment in the mobile device according to the exemplary embodiment of the present disclosure divides a thin hypervisor (i.e., the integrity monitor) into privileged and non-privileged regions according to operational criticality in terms of the monitoring platform self-protection through the trust anchor self-protection mechanism (SelMon). As for security-critical objects, the hypervisor exception vector, page tables, and system control registers are defined as the security-critical objects that are isolated in the privileged region. Whereas, the non-privileged region performs fundamental operations for the OS kernel integrity protection. Since the non-privileged region is vulnerable, it is assumed that this region may be exploited by an attacker. However, since an attack triggered from the non-privileged region is effectively isolated in the non-privileged region, the hypervisor is preserved. This is because the trust anchor self-protection mechanism (SelMon) satisfies the following conditions.

First, the non-privileged region is unable to access hypervisor-managed page tables. Accordingly, attempts to manipulate memories directly are thwarted. Second, the security-critical instructions do not exist in the non-privileged region. Accordingly, the attacker is unable to change a system configuration such as an exception vector address. Finally, the attacker is unable to reuse a critical instruction in the privileged region because the entire privileged region is enforced to be non-executable during the non-privileged region is activated. The switches between the regions are managed through predefined methods. The present exemplary embodiment designs the secure gate to manage the entries for respective regions in a way of ensuring the security of the privileged region.

In (5.2) Security-critical objects, the followings are the security-critical objects in the system design.

The critical objects that may be exploited by the attacker should be properly verified and isolated. The hypervisor exception vector, page tables, and hypervisor-related system registers are critical components that are required to be protected.

Accordingly, the apparatus for reinforcing the security of the trusted execution environment in the mobile device according to the present exemplary embodiment may extend analysis to protect more complex software such as the OS kernel and bundled hypervisors (e.g., KVM).

Figure 4:
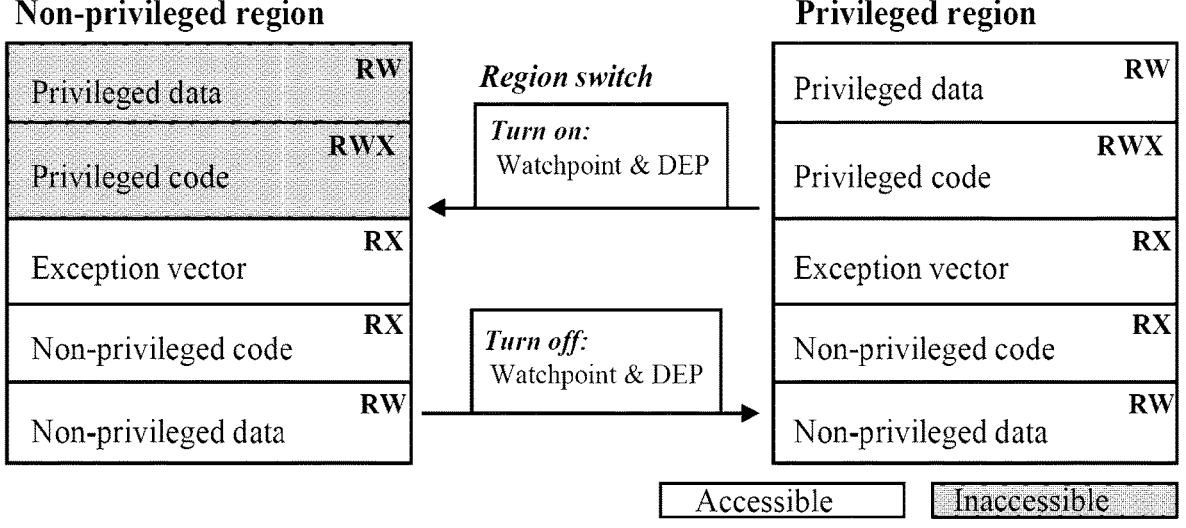
FIG. 4 is a view illustrating support for intra-region privilege separation of the apparatus for reinforcing the security of the trusted execution environment in the mobile device according to the exemplary embodiment of the present disclosure.

FIG. 4 is a view illustrating support for intra-region privilege separation of the apparatus for reinforcing the security of the trusted execution environment in the mobile device according to the exemplary embodiment of the present disclosure. As shown in FIG. 4, the trust anchor self-protection mechanism (SelMon) supports intra-region privilege separation by using the general hardware features such as a debugging watchpoint and DEP. For strict isolation and protection of the privileged region, switches between the regions are performed by predefined and narrow interfaces, which timely configure hardware features.

In the system design of the present exemplary embodiment, security-critical objects are listed as follows: (5.2.1) Page tables, (5.2.2) Hypervisor exception vector, and (5.2.3) System control registers.

In (5.2.1), there are two types of the page tables, which are managed by the hypervisor, the page tables including: a hypervisor table and a secondary page table. Regardless of the types, the tables are regarded as the critical objects that are required to be protected. First, virtualization extension in the page tables for the hypervisor mode supports virtual addresses in the hypervisor mode. To enable the MMU in the system design, the hypervisor is required to configure page tables and a page table base register. In addition, the system design may configure the page tables to set hypervisor code and data as read-only. In addition, the system design may also enable security features such as DEP. However, in the system design, when the attacker escalates his or her privilege to the hypervisor, the settings for protection are no longer effective. For example, the attacker may make hypervisor text pages writable and freely modify the code. As mentioned earlier in the description of Kernel Integrity Monitor, the monitor (i.e., the thin hypervisor) manages the secondary page table so that the OS kernel text and code are immutable (read-only). However, this secondary page table may also be exploited to compromise the hypervisor integrity. The attacker may manipulate the entry of the secondary page table such that the hypervisor memory region is mapped to the OS kernel. In this way, the hypervisor is maliciously modified even by the kernel having a lower privilege.

In (5.2.2), a hypervisor exception vector is code for dispatching a handler routine corresponding to a current exception. Any exception occurrence changes a program counter to a predefined location of the exception vector. The hypervisor exception vector has different branches depending on an exception occurrence privilege (i.e., a current or lower privilege). For example, a hypercall triggered by the OS kernel is trapped by a branch due to an exception having a lower privilege. However, all exceptions that occur in the hypervisor mode execution are trapped by branches for a current (hypervisor) privilege. Since the exception vector serves as a code dispatcher, the integrity of the vector should be protected to prevent the attacker from redirecting a control flow to a malicious code.

In (5.2.3), system control registers may become targets of attacks. For example, the TTBR may be modified to map a malicious page table. A Vector Base Address Register (VBAR) may be abused to replace a current exception vector with a malicious vector. The trust anchor self-protection mechanism (SelMon) removes all security-critical instructions from a code region of the OS to prevent the attacker from exploiting the system registers. The critical instructions exclusively exist in the privileged region. In addition, the attacker is unable to redirect a control flow to an arbitrary location in the privileged region.

In (5.3) Privilege separation, the following describes logical separation of the hypervisor privilege. The privilege separation is performed based on accessibility to the critical objects classified from the previously described security-critical objects.

In (5.3.1) Privileged region, the critical objects are isolated in the privileged region. Writable objects such as page tables are protected as privileged data. In addition, the exception vector and the privileged region code are separated based on the granularity of page, which is 4 KB. As shown in FIG. 4, page permissions are set differently. The exception vector and privilege code are all executable and the pages for privileged code have a writable permission, whereas an exception vector page is read-only. The writable permission is provided to dynamically adjust the executability of the privileged code in the entry for the non-privileged region. In a section for describing the privileged region protection below, an access control mechanism of the privileged region will be described.

In (5.3.2), the non-privileged region performs general operations required for monitoring the OS kernel. As described above in the kernel integrity monitor, the monitor should emulate the updates of page tables and system registers for the monitored OS kernel. The integrity monitor is implemented so that the system registers such as the kernel TTBR are updated by the hypervisor. The kernel page tables are enforced to be managed by the non-privileged regions of the monitor. The trust anchor self-protection mechanism (SelMon) is applied to the hypervisor to highlight the feasibility and superiority thereof in protecting the trust anchor compared to those of the conventional approaches. Accordingly, implementing the kernel integrity monitor is not a major contribution. However, minimal functionalities of the monitoring kernel has been implemented to evaluate the performance of the trust anchor self-protection mechanism (SelMon).

Next, in (5.4), privileged region protection is described below. The critical operations that may be exploited to compromise the hypervisor integrity are exclusively performed in the privileged region. In addition, critical data objects such as page tables are isolated in the privileged region. Accordingly, in the privileged region protection, when the non-privileged region is activated, the privileged region should not be executable and accessible.

Non-executability is described as follows. In order not to allow the privileged region to be executable, the hardware feature for DEP enforcement is used. When a Writable Execute Never (WXN) flag in a hypervisor system control register (SCTLR_EL2) is set, all the writable pages in the hypervisor region is non-executable. In the privileged region section of the privilege separation, the hypervisor system control register (SCTLR_EL2) configures a page permission of the privileged code as writable in order to leverage this feature. Accordingly, the hypervisor system control register (SCTLR_EL2) may dynamically apply the non-executability of the privileged region by setting the WXN flag in the entry for the non-privileged region.

Non-accessibility is described as follows. In addition to the non-executability feature, the apparatus for reinforcing the security of the trusted execution environment in the mobile device according to the present exemplary embodiment is required to ensure that the privileged region should not be accessible during the non-privileged region is activated. By doing so, the apparatus for reinforcing the security of the trusted execution environment in the mobile device according to the present exemplary embodiment may protect not only the critical data objects such as page tables but also the privileged code mapped with a writable permission. To this end, a watchpoint, which is a general hardware feature, is used to monitor any read or write access to the privileged region. The apparatus for reinforcing the security of the trusted execution environment in the mobile device configures the watchpoint in an entry for the hypervisor, so as to monitor the entire privileged region. Then, when the entire privileged region is switched to the non-privileged region, the watchpoint is activated.

As described in the hardware debugging support, a start address of the watchpoint monitoring is required to be aligned to a size of the monitoring, which should be aligned to a power of 2. To satisfy this requirement, the apparatus according to the present exemplary embodiment allocates 8 MB to the privileged region and manages the start address of the region to be aligned to the 8 MB granularity.

Figure 5:
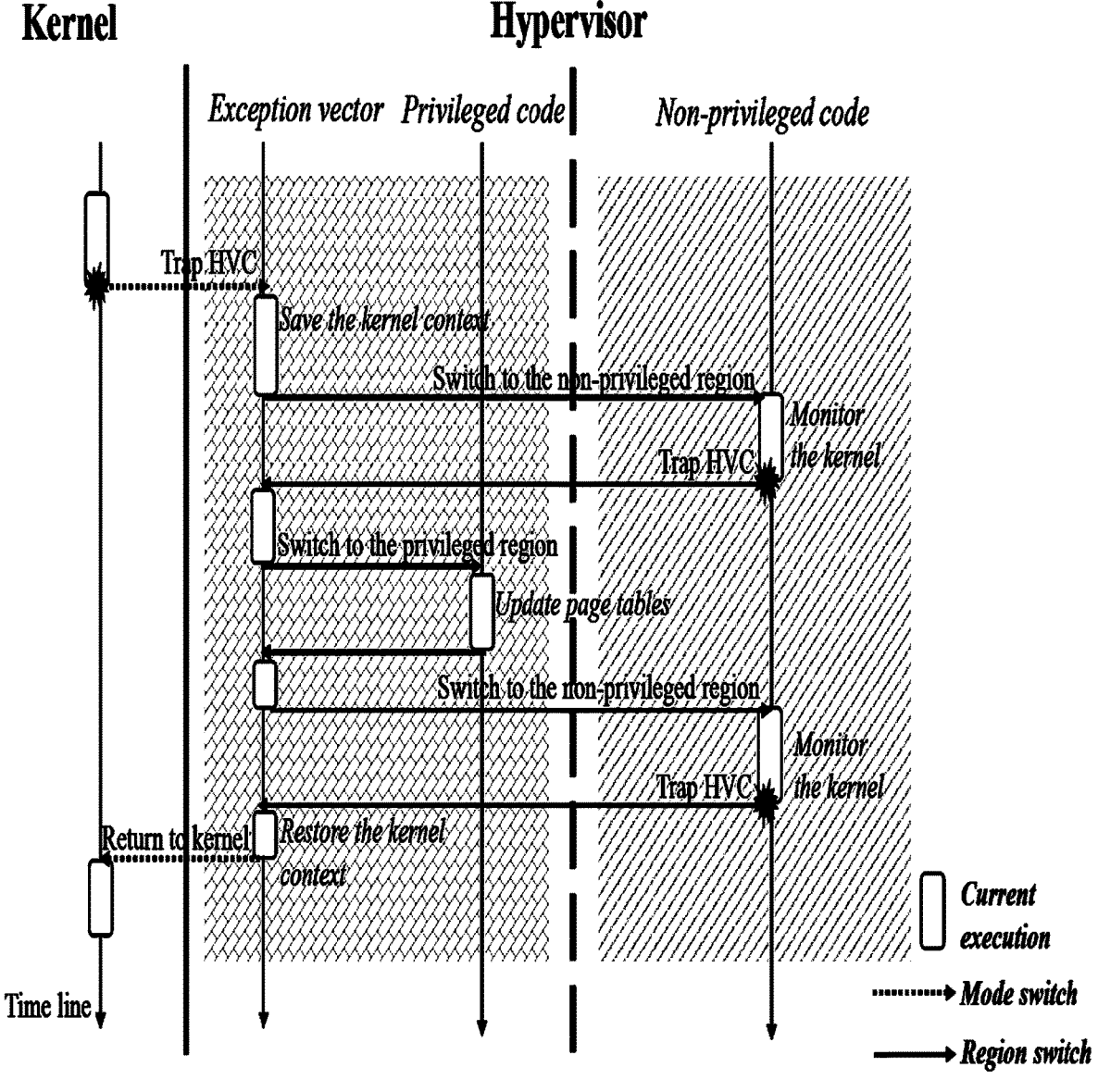
FIG. 5 is a view illustrating mode and region switches, which use SelMon.

In (5.5), region switch is described as follows. FIG. 5 is a view mode and region switches, which use SelMon. Referring to FIG. 5, a flow of region switches between privileged and non-privileged regions is described. As described above in the kernel integrity monitor, when a hypercall ported for the OS kernel monitoring is invoked from the OS kernel, a hypercall exception is trapped by an exception vector in the privileged region. The vector verifies a type of OS request (e.g., a TTBR configuration or page table update) and dispatches a proper handler in the non-privileged region. At this time point, a region switch occurs from the privileged region to the non-privileged region. In the present exemplary embodiment, as described in the privileged region protection, the region switch occurs through a secure gate that configures a watchpoint and DEP flag in order to isolate the privileged region.

Meanwhile, in the present exemplary embodiment, during the non-privileged region is executed, there may be a request for a security-critical operation such as updating a hypervisor page table.

For example, the hypervisor is required to generate a mapping to the OS kernel region in order to update the page table of the OS. To handle this request, a region switch to the privileged region should occur. The present exemplary embodiment manages this switch by using a hypercall captured by the exception vector in the privileged region. Details of respective entries for the regions are described in the following section.

Listing 4 is the entries of the hypervisor that configures watchpoint-related registers ---
(Listing 4)
---

```
1 //...( Omitted : save kernel registers )...
2 // Setup hypervisor trap for debug exception
3
4 L1:
5 mov x4,# MDCR_TDE // Get the MDCR value
6 msr MDCR_EL2,x4 // Set the MDCR
7 isb // Synchronization barrier
8 mov x5,# MDCR_TDE // Get the MDCR value
9 cmp x4,x5 // Validate the set value
10 b.ne L1 // If invalid, loop back
11
12 L2:
13 mov x4,# MDSCR_KDE_MDE // Get the MDSCR value
14 msr MDSCR_EL1,x4 // Set the MDSCR
15 isb // Synchronization barrier
16 mov x5,# MDSCR_KDE_MDE // Get the MDSCR value
17 cmp x4,x5 // Validate the set value
18 b.ne L2 // If invalid, loop back
19
20 L3:
21 mov x4,# WPVALUE // Get the monitoring addr.
22 msr DBGWVR0_EL1,x4 // Set the watchpoint addr.
23 mov x5,# WPVALUE // Get the monitoring addr.
24 cmp x4,x5 // Validate the set value
25 b.ne L3 // If invalid, loop back
26
27 L4:
28 mov x4,# WPCTLR_LO // Get the control flag ( low )
29 mov x5,# WPCTLR_HI // Get the control flag ( high )
30 add x4,x4,x5 // Get the full control value
31 msr DBGWCR0_EL1,x4 // Configure the watchpoint
32 mov x5,# WPCTLR_LO // Get the control flag ( low )
33 mov x6,# WPCTLR_HI // Get the control flag ( high )
34 add x5,x5,x6 // Get the full control value
35 cmp x4,x5 // Validate the configured value
36 b.ne L4 // If invalid, loop back
```

In (5.5.1), entry to the hypervisor is described as follows.

In the entry to the hypervisor, when the CPU mode switches to the hypervisor, the trust anchor self-protection mechanism (SelMon) configures the watchpoint-related registers (Listing 4) in addition to saving the kernel context. The TDE flag in MDCR_EL2 is set to route a watchpoint exception to the hypervisor. KDE and Monitor Debug Event (MDE) flags are set to allow the watchpoint exception to be generated in the hypervisor mode. Then, DBGWCR and DBGWVR are set to monitor the entire privileged region.

Since the watchpoint configuration is static, predefined constant values are loaded for the registers. In addition, after setting the watchpoint registers, the watchpoint configuration checks whether currently configured values are the predefined values or not, so that the attacker is prevented from exploiting configuration instructions to neutralize the watchpoint-based protection. Even after such registers are set, in the watchpoint configuration, the watchpoint remains deactivated because a debug (D) flag in PSTATE is masked. As described in the hardware debugging support section, the PSTATE.D is always masked (i.e., cleared) whenever an exception occurs.

Listing 5 is the entry to the non-privileged region that enables the DEP and watchpoint.

---
(Listing 5)
---

```
1 L5:
2 mov x4,# SCTLR_WXN_LO // Get the SCTLR value
3 add x4,x4, # SCTLR_WXN_HI
4 msr SCTLR_EL2,x4 // Set the SCTLR
5 isb // Synchronization barrier
6
7 mov x5,# SCTLR_WXN_LO // Get the SCTLR value
8 add x5,x5, # SCTLR_WXN_HI
9 cmp x4,x5 // Validate the set value
10 b.ne L5 // If invalid, loop back
11
12 tlbi ALLE2 // Invalidate the TLB
13 isb // Synchronization barrier
14
15 adr x4,savedPrivStack
16 str sp,[x4] // Save the priv stack
17 adr x4,savedNonPrivStack
18 ldr x4,[x4]
19 mov sp,x4 // Switch to the non - priv stack
20
21 msr DAIFclr, #8 // Enable the debug exception
22 b non_priv_reg // Jump to the non - priv region
```

In (5.5.2), entry to the non-privileged region is described as follows. The privileged region is hidden from the entry for the non-privileged region. This is realized by a gate for handling a region switch to the non-privileged region (Listing 5). A WXN flag is set in SCTLR_EL2 in order to enforce the non-executability of the privileged region. Accordingly, the privileged region code, which is set as writable, is enforced to be non-executable. After setting this system register, the present embodiment checks whether the configured value is equal to a predefined value to prevent the configuration misuse.

Since SCTLR_EL2 controls the MMU, the attacker may execute this instruction to disable the MMU. To prevent such an attempt, the present embodiment maps a hypervisor virtual address as identical to a physical address. Accordingly, even when the MMU is disabled, a value verification routine following the SCTLR_EL2 setting is still effective. The weak point of using WXN is that a TLB flush is required. Since the hypervisor mode does not provide an Address Space Identifier (ASID), the entire TLB for the hypervisor is flushed out. Whereas, the ASID may be used in the kernel mode for both of the secure and non-secure states. Accordingly, when applied to kernel-mode protection, the trust anchor self-protection mechanism (SelMon) is expected to have performance improvements. In addition, after enabling the WXN, the trust anchor self-protection mechanism (SelMon) saves and restores respective stacks for the privileged and non-privileged regions.

The stack are allocated in units of core, but the stack pivot logic based on a current CPU ID is omitted. Finally, the watchpoint monitoring is activated by clearing a debug mask bit in the PSTATE and jumping to the non-privileged region.

Entry to the privileged region is described as follows (Listing 6). A hypercall hvc, which automatically disables a watchpoint, is trapped by the exception vector. The DEP is disabled before entering the privileged region.

---

(Listing 6)

```
 1 /* ********** Non - privileged region ********** */
 2 hvc # REQNO // Hypervisor call
 3
 4 /* ************ Exception vector ************ */
 5 //...( Omitted : verify the current exception )...
 6
 7 L6:
 8 mov x4,# SCTLR_NOWXN_LO // Get the SCTLR value
 9 add x4,# SCTLR_NOWXN_HI
10 msr SCTLR_EL2,x4 // Set the SCTLR
11 isb // Synchronization barrier
12
13 mov x5,# SCTLR_NOWXN_LO // Get the SCTLR value
14 add x5,# SCTLR_NOWXN_HT
15 cmp x4,x5 // Validate the set value
16 b.ne L6 // If invalid, loop back
17
18 tlbi ALLE2 // Invalidate TLB
19 isb // Synchronization barrier
20
21 adr x4,savedNonPrivStack
22 str sp,[x4] // Save the non - priv stack
23 adr x4,savedPrivStack
24 ldr x4,[x4]
25 mov sp,x4 // Switch to the priv stack
26
27 b priv_reg // Jump to the privileged region
```

---

In (5.5.3), entry to the privileged region is described as follows. An entry for the privileged region requires a non-privileged code to invoke a hypercall, which is trapped by the exception vector. As described in the hardware debugging support section, the exception automatically sets PSTATE.D to disable the watchpoint monitoring, thereby causing the privileged region to be accessible. In addition, the vector clears the WXN of SCTLR_EL2 to make the privileged code executable, thereby turning the Data Execution Prevention (DEP) off. A stack is also switched for the privileged region.

In contrast to the privileged code, the gate to the privileged region (Listing 6) is accessible (executable) at all times regardless of an activated region. Accordingly, the attacker may attempt to directly jump in the middle of the gate code to disable the Data Execution Prevention (DEP). In this way, the privileged region may become executable without invoking the hypercall.

However, this malicious behavior may be easily detected by the trust anchor self-protection mechanism (SelMon) because the watchpoint is still active due to the absence of the exception. In particular, when execution of the gate code is continued without disabling the watchpoint monitoring, a watchpoint exception occurs, which may be distinguished by investigating an Exception Class (EC) field in an Exception Syndrome Register (ESR). For example, line 22 in Listing 6 causes occurrence of the watchpoint exception because savedNonPrivStack, which is a repository of a non-privileged region stack, is a partial piece of privileged data monitored by the active watchpoint.

In (5.5.4), exit from the hypervisor according to the present exemplary embodiment is as follows. When the exit from the hypervisor occurs, the saved kernel context including the general registers and watchpoint configurations are restored. Since this routine is also exposed to the non-privileged region, the attacker may attempt to abuse the instructions that update the configurations. However, the exit routine ends with an eret instruction that de-privileges the CPU mode to kernel and returns to a point immediately after the hypercall invocation in the kernel. Accordingly, the attacker also loses the hypervisor privilege thereof.

In (5.6), compatibility with a debugging activity of the apparatus for reinforcing the security of the trusted execution environment in the mobile device according to the exemplary embodiment of the present disclosure is as follows. Watchpoints are the shared resource between different processor modes. However, because of saving and restoring the previous settings at the entry to and exit from the hypervisor mode, the trust anchor self-protection mechanism (SelMon) does not interfere with the use of watchpoints outside of the current protection mode. For example, the debugging of the apparatus for reinforcing the security of the trusted execution environment in the mobile device may still be used in the presence of the trust anchor self-protection mechanism (SelMon), which is a kernel-mode debugger and uses the watchpoints to set data breakpoints. In addition, the dynamic reconfiguration of the DEP does not affect the security of other modes because system control registers are banked for each mode. To debug the privileged software such as the hypervisor and trusted firmware, a hardware debugger having a JTAG interface is generally used. SelMon should be disabled to prevent undesired configuration corruption because the hardware debugger also configures watchpoints so as to monitor data access.

TABLE 3

Table 3 shows the system registers used to create SelMon.

| System register | Description |
|---|---|
| DBGWVR & DBGWCR | Configure watchpoint |
| DAIFCLR | (Un)mask debug exception |
| MDCR | Configure watchpoint exception handling location |
| SCTLR | Configure DEP |
| ESR | Validate trapped exception |

In (6), implementation of the apparatus for reinforcing the security of the trusted execution environment in the mobile device according to the present exemplary embodiment is described as follows.

The trust anchor self-protection mechanism (SelMon) is small enough to be manually audited or formally verified. The LoC of the current implementation of the hypervisor is approximately 770 in assembly without including a kernel patch for invoking critical operation emulation (520 Loc and 250 Loc for the privileged region and the non-privileged region, respectively). The operation performed by the non-privileged region in the implementation is limited to emulating the critical OS kernel operations such as updating page tables and TTBR, and is sufficient to demonstrate the feasibility of the trust anchor self-protection mechanism (SelMon). For example, in the additional security components, the LoC of the non-privileged region may be larger when the kernel monitor is fully implemented by way of tracking kernel memory double mapping.

The apparatus for reinforcing the security of the trusted execution environment in the mobile device according to the present exemplary embodiment reserves a physical memory range from 0xFE000000 to 0xFEFFFFFF (16 MB) by modifying a Linux device tree file (juno.dtsi) for the thin hypervisor implementation. Then, a secondary page table that maps all physical memory ranges except for a region reserved for the hypervisor isolation is generated. Next, the present embodiment locates the secondary page table from 0xFE000000. Thereafter, when a page table setting is completed, control registers for enabling the secondary paging, such as a Virtualization Translation Table Base Register (VTTBR_EL2), a Virtualization Translation Control Register (VTCB_EL2), and a Hypervisor Configuration Register HCR_EL2 are configured.

To implement the features of kernel integrity monitoring in the kernel patches and hypervisor, the instructions for setting the security-critical system registers such as TTBR and VBAR are replaced with hypervisor calls (i.e., hvc). In addition, in the implementation of kernel integrity monitoring features, the hypervisor calls are inserted into page-table management functions (e.g., set pte and set pmd) to verify and emulate updates of the write-protected kernel page tables in the hypervisor. The physical memory for hosting the kernel text is set as read-only in the secondary page table so that patches in the text are also immutable. To apply the trust anchor self-protection mechanism (SelMon) to the thin hypervisor, the hypervisor memory of 16 MB is divided into two halves of 8 MB each.

In each region, the location and size of the privileged region are aligned to the power of 2, so the watchpoint setting requirements (refers to the hardware debugging support section) are satisfied. In the implementation, only one watchpoint is required for enabling the trust anchor self-protection mechanism (SelMon). However, the location and size of each region may be flexibly adjusted using multiple watchpoints.

Finally, Table 3 summarizes the system registers that the trust anchor self-protection mechanism (SelMon) uses to realize intra-region privilege separation. The system registers are defined as a part of a specification for high-end ARM processors (e.g., ARMv8-A) and are generally supported in production devices unless the system registers are intentionally disabled or modified by manufacturers.

In the present exemplary embodiment, even though the system registers are available, the manufacturers' intervention is required to deploy SelMon in production devices. This is because secure boot that checks the integrity of the loaded images (e.g., the secure OS and hypervisor) by using the manufacturer's key at boot time is generally used in modern devices. ARMv8-M, which is a low-end specification for microcontrollers, also defines a debug feature including watchpoints.

However, due to the architecture discrepancy between ARMv8-A and ARMv8-M, it is expected that more design consideration will be required in a case of building SelMon on low-end devices. This is described in Chapter (8).

In (7), evaluation of the apparatus for reinforcing the security of the trusted execution environment in the mobile device according to the present exemplary embodiment is described as follows.

In this chapter, a method of analyzing and effectively blocking a possible attack surfaces of the trust anchor self-protection mechanism (SelMon) is described. Then, the performance overhead incurred by the trust anchor self-protection mechanism (SelMon) is measured.

In (7.1), security analysis of the apparatus according to the present exemplary embodiment is as follows.

The security of the trust anchor self-protection mechanism (SelMon) depends on the proper configuration of the general hardware features (e.g., the watchpoint and DEP). SelMon may be bypassed when the attacker successfully manipulates the configuration. In this regard, a method in which SelMon effectively restricts the attacker from accessing the features is described.

In the hypervisor code, it is assumed that the non-privileged region code does not contain instructions capable of configuring the critical system registers (e.g., TTBR and VBAR). In addition, instructions for updating page tables and watchpoints are not present in the corresponding region. The attacker is unable to modify the region because the non-privileged region code is mapped with read-only permission in the hypervisor page table. The attacker's remaining option is to inject malicious code into a writable region and execute the injected code. However, this attack is simply prevented because the DEP is always enabled at an entry point to the non-privileged region.

Meanwhile, the security-critical operations are performed in the privileged region. As described in Section (5.4) Privileged region protection, the privileged region is neither accessible nor executable during the non-privileged region activation. Accordingly, not only may the attacker manipulate the privileged region, but the attacker may not reuse the critical instructions in the corresponding region.

In mode switch as described in Subsection (5.5.1) and (5.5.4), a watchpoint is configured when entering and exiting the hypervisor. The hypervisor entry and exit handlers are mapped as read-only, but are still executable regardless of the current region privilege. Accordingly, the attacker may attempt to abuse the watchpoint configuration instructions. When one of the TDE, KDE, and MDE flags is cleared, the watchpoint monitoring is disabled, whereby the attacker may access the privileged region. When the watchpoint address register (DBGWVR) and control register (DBGWCR) are maliciously reconfigured, the watchpoint protection is also disabled.

The registers related to watchpoints are set to predefined values in the hypervisor entry. Accordingly, the registers related to the watchpoints may be verified with constant values immediately after the configuration. When the mode is switched back to the kernel, the register values are restored to the kernel settings. Since the kernel settings are saved in the privileged region, the attacker is unable to manipulate the kernel settings. In addition, abusing the exit routine is not advantageous for the attacker because the attacker directly loses the hypervisor privilege thereof. That is, the last instruction, eret, in the exit routine switches the CPU mode to the kernel. Between region switches, SelMon configures the DEP and the debug masking (D) flag in the PSTATE. Since PSTATE.D is configured using an immediate value (#8), the attacker is unable to abuse the instruction to reconfigure the flag with a general register that delivers a malicious value. Care should be taken for the DEP configuration because the watchpoint-related registers are required to change the System Control Register (SCTLR). In addition, similar to the watchpoint configuration protection, the watchpoint-related registers verify the values configured after being written into the SCTLR. Not only the DEP flag but also other flags are required to be protected because other system settings such as the MMU are controlled by the SCTLR. The SCTLR value should be constant so that the verification is to be simple. The verification is done just by comparing the written value with a predefined legitimate value. Due to a timing gap between the configuration and verification, the MMU may be temporarily disabled. However, the verification is still effective because of mapping a virtual address identically to a physical address. Accordingly, the attacker is unable to bypass the verification. In particular, for a successful region switch, the gate to the privileged region should be executed by using the hypercall that is a predefined interface. Any attempt to jump to the gate without invoking the hypercall generates a watchpoint exception. Finally, interrupts are not enabled because the hypervisor mode has a small set of functionality. Accordingly, consideration from the security perspective is not required for the interrupts during the gate code execution. For a successful region switch, any attempt to jump to the gate without invoking the hypercall causes to generate a watchpoint exception. Finally, interrupts are not enabled because the hypervisor mode has a small set of functionality. Accordingly, consideration from the security perspective is not required for the interrupts during the gate code execution. For a successful region switch, any attempt to jump to the gate without invoking the hypercall causes to generate a watchpoint exception. Finally, interrupts are not enabled because the hypervisor mode has a small set of functionality. Accordingly, consideration from the security perspective is not required for the interrupts during the gate code execution.

Even when the interrupts are enabled, the interrupts may not hamper the security of SelMon because the single exception vector is used for both of the privileged and non-privileged regions. Accordingly, in the present exemplary embodiment, the interrupts may be enforced to be securely handled by the privileged region. In an untrusted kernel, the colluding of the untrusted kernel by the attacker is required to be considered. For example, the attacker may return into a malicious kernel code once the hypervisor privilege is obtained. Accordingly, once the hypervisor mode is activated, any other region than the hypervisor may not be executable. Eliminating this attack vector is straightforward. The kernel region is mapped with a Never Execute (NX) permission in the hypervisor page table.

The effectiveness against real-world attacks is described as follows. Preventing an attacker from exploiting existing vulnerabilities of trust anchors may be unstoppable because SelMon does not aim to detect or remove software vulnerabilities. However, as a baseline defense of the system, SelMon protects the integrity of the trust anchor and isolates critical operations, thereby greatly restricting the attacker's ability to compromise the system.

In (7.2), performance of the apparatus for reinforcing the security of the trusted execution environment in the mobile device according to the exemplary embodiment of the present disclosure is described as follows. The apparatus for reinforcing the security of the trusted execution environment in the mobile device evaluates the overhead of SelMon by measuring the performance of the hypervisor, application, and OS. In particular, the performance of hypervisor operation primitives, which are required to implement the kernel integrity monitor (e.g., the TTBR update), is measured. Thereafter, three benchmarks, namely SPEC CPU2006, LMBench, and Phoronix Test Suite, are conducted to measure the performance of the application and OS, which run on the original and SelMon-hardened hypervisors.

TABLE 4

| Operation | Baseline | SelMon | Stdev | Overhead |
|---|---|---|---|---|
| Mode switch | 3.2 | 4.2 | 0.63 | 1.31× |
| TTBR update | 4.0 | 5.2 | 1.03 | 1.30× |
| Page table update | 4.4 | 6.5 | 1.08 | 1.47× |

Table 4 is a simple operation performance of the original and hardened hypervisors. This Table 4 shows an average latency (in has) and a standard deviation of 10 runs for each case of SelMon.

In (7.3), hypervisor of the apparatus for reinforcing the security of the trusted execution environment in the mobile device according to exemplary embodiment of the present disclosure is described as follows. In the apparatus for reinforcing the security of the trusted execution environment in the mobile device, when SelMon is adopted, an overhead is generated due to privilege separation and domain switches thereof. As described in Section (5.1) SelMon of system design, SelMon is applied to the thin hypervisor that monitors the OS kernel. Thereafter, the performance of hypervisor operations such as the updates of TTBR, page tables, and kernel memory is evaluated. Specifically, times for respective operations performed on the SelMon-hardened and original hypervisors are measured and compared with each other.

As shown in Table 4, SelMon imposes an overhead of 31% on a simple switch between the kernel and hypervisor. This overhead includes constant times for the hypervisor entry, non-privileged region entry, and hypervisor exit. In addition to the simple switch time, the TTBR update case requires more time to execute an update instruction in the non-privileged region. Since additional region switches are not required when the instruction is executed, the overhead is not increased compared to that of the corresponding instruction.

Whereas, in the mode switch, the page table update case requires switches between the non-privileged and privileged regions. An update request is transmitted by invoking a hypervisor call from the nonprivileged region. This call causes a switch to the privileged region. Once the page table is updated, the non-privileged region is reactivated through the region switch gate. Compared to the other two cases, these additional operations are the main factors that increase the overhead of SelMon.

The performance of OS kernel access is also estimated (See Table 5). An overhead of approximately 30%, which is similar to that of the simple switch, was imposed by single read and single write operations. However, the overhead was obscured as a processing data size increases. When the size for the write and read operation is greater than 80 bytes, the respective overheads are significantly reduced to 6% and 2%. The OS kernel region is pre-mapped to the hypervisor. Accordingly, an overhead for the page table update (i.e., the hypervisor or secondary page table update) is not included in this result.

In (7.4), application and OS benchmarks of the apparatus for reinforcing the security of the trusted execution environment in the mobile device according to the exemplary embodiment of the present disclosure are described as follows.

The evaluation of the performance impact of SelMon to applications is conducted by running LMBench and SPEC CPU2006 benchmarks. Whereas, the evaluation of the overhead imposed to the OS kernel in the apparatus for reinforcing the security of the trusted execution environment in the mobile device according to the present exemplary embodiment is conducted by using a kernel test collection provided by Phoronix Test Suites.

In LMBench, latencies of fundamental OS operations are measured in two environments (i.e., OSs respectively running on the original and hardened hypervisors). Table 6 shows results in units of microseconds. The simple operations, which merely introduce low latencies, including syscall, read, write, stat, open, signal handler, and sock, did not show any significant impact of SelMon. The reason is that each test case does not invoke the hypervisor during the measurement of an execution time. More specifically, considering that the hypervisor is invoked for the context switch (the TTBR update) and OS page-table update, those tests do not include such OS operations during the measurement.

TABLE 5

| | 8 bytes | | 80 bytes | | 800 bytes | |
| --- | --- | --- | --- | --- | --- | --- |
| Operation | Baseline | SelMon | Baseline | SelMon | Baseline | SelMon |
| Read | 3.8 | 5.1 (σ: 0.56, 1.34×) | 7.9 | 8.1 (σ: 1.1, 1.02×) | 50.7 | 52.1 (σ: 3.63, 1.02×) |
| Write | 4.4 | 5.7 (σ: 0.67, 1.29×) | 7.8 | 8.3 (σ: 0.82, 1.06×) | 51 | 53.7 (σ: 2.98, 1.05×) |

Table 5 shows the performance of the read and write operations on the original and SelMon-hardened hypervisors. In Table. 5, the average latencies of 10 runs (in μs), standard deviations, and overheads are described. The size of operations varies from 8 to 800 bytes. A target memory region is pre-mapped. Accordingly, the operations do not include the overhead of the page table update.

TABLE 6

| | Baseline | SelMon | Stdev | Overhead |
| --- | --- | --- | --- | --- |
| syscall | 0.690 | 0.690 | 0.004 | 1.00× |
| read | 1.545 | 1.546 | 0.009 | 1.00× |
| write | 1.310 | 1.313 | 0.004 | 1.00× |
| stat | 4.939 | 4.953 | 0.012 | 1.00× |
| open + close | 10.886 | 10.956 | 0.209 | 1.01× |
| signal handler | 6.532 | 6.534 | 0.225 | 1.00× |
| sock stream | 26.093 | 26.531 | 0.919 | 1.02× |
| fork + exit | 565.940 | 745.142 | 7.134 | 1.32× |
| fork + execve | 1466.65 | 1899.20 | 60.620 | 1.29× |
| \bin\sh -c | 5639 | 7249 | 37.824 | 1.29× |

Table 6 shows the LMBench results from Linux OSs on the original and SelMon-hardened hypervisors. The average latency (in μs) and standard deviation of 10 runs of each SelMon test case are described.

Figure 6:
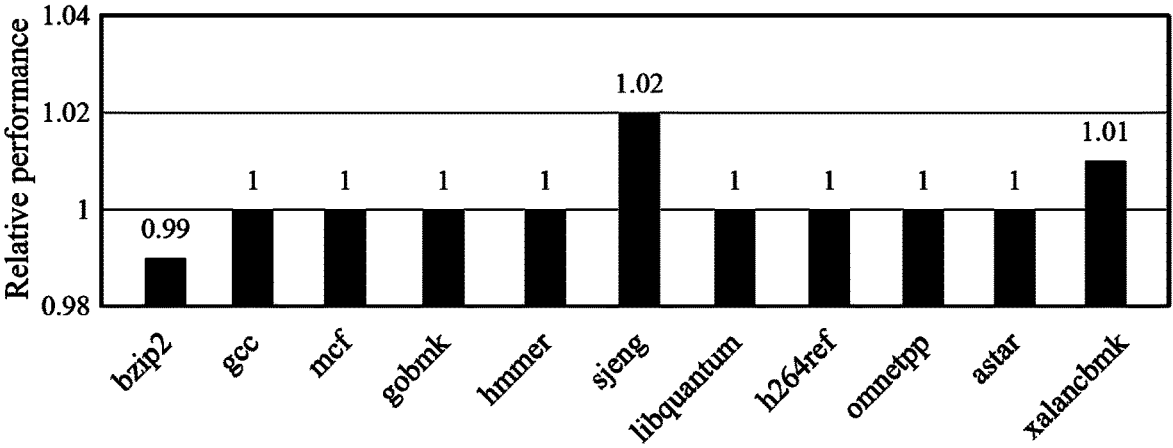
FIG. 6 is a view illustrating SPEC CPU2006 having original and SelMon-hardened hypervisors.

FIG. 6 is a view illustrating SPEC CPU2006 having the original and SelMon-hardened hypervisors. The results are normalized to values of performance measured with the original hypervisor.

Figure 7:
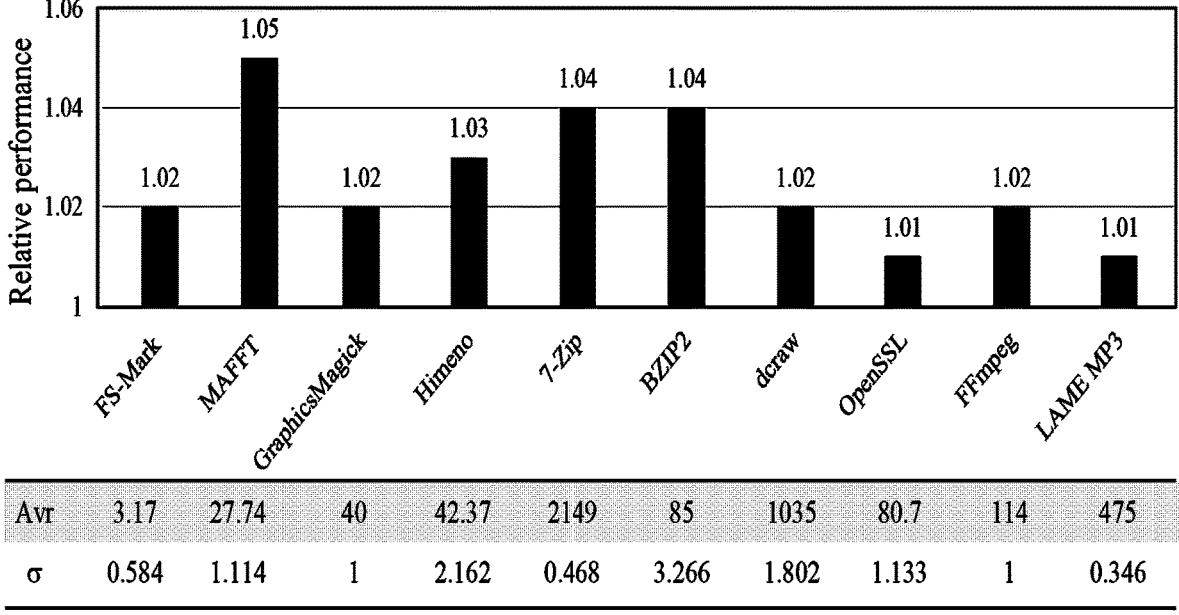
FIG. 7 is a view illustrating OS performance evaluated by executing Phoronix Test Suite together with the original and SelMon-hardened hypervisors.

FIG. 7 is a view illustrating OS performance evaluated by executing the Phoronix Test Suite with the original and SelMon-hardened hypervisors. The average 5 runs using SelMon is normalized to that of the original hypervisor.

However, the last three test cases, i.e., the execution of fork, execve, and shell, impose an overhead of approximately 30%, being aligned to the SelMon's overhead that is imposed on the hypervisor operating primitives. As described in Section (7.3), the test results showed that the overhead was incurred due to the constant latencies of the mode and region switches. The results indicate that the last three cases frequently invoke the hypervisor operations that update the OS page tables for new process creation. Additionally, due to the relatively high latencies of the last three test cases, there may be several context switches that invoke the hypervisor to support the TTBR updates.

Contrary to the results of LMBench, the overhead measured with CPU2006 was negligible. A maximum overhead of 2% was observed in sjeng. Specifically, bzip2 including SelMon shows better performance.

It is expected that this result is caused by the noise generated by various factors (e.g., CPU throttling). The result implies that a portion of operations (i.e., the updates of page tables and TTBR) that invoke the hypervisor is not significant in each application. Most of the SelMon overhead was obscured because of the longer runtime (in seconds) compared to that of LMBench.

Next, in the Phoronix Test Suite, the performance impact to the OS kernel due to the adoption of SelMon is evaluated. As shown in FIG. 7, ten kernel test programs from Phoronix Test Suite are used. The overhead varies from 1% to 5% with OpenSSL and MAFFT. In addition to MAFFT, 7-ZIP and bzip2 introduce a relatively high overhead of 4%. The bzip2 in FIG. 7 uses a much larger input (256 MB) than that of the bzip2 in FIG. 6 (at most 50 MB). Large file compression requires frequent context switches and page faults due to disk read and copy operations. Due to this requirement, the hypervisor is more frequently invoked because of the hypercalls inserted in context switch and page fault handlers.

Finally, compared to SPEC CPU2006, most test cases from Phoronix cause higher overheads to incur due to kernel intensive operations thereof.

The apparatus for reinforcing the security of the trusted execution environment in the mobile device according to the present exemplary embodiment shows the efficiency of SelMon by porting the trust anchor self-protection mechanism (SelMon) to the hypervisor, but may be adapted to protect software for running in the kernel mode, and also provides the required hardware features (i.e., the DEP and watchpoints). Since both of these features are generally available in the secure state, the OS kernel hosted in Rich Execution Environment (REE) as well as the TEE created by TrustZone may be armed with SelMon to perform the self-protection. In order to realize this, some engineering effort is required. For example, a privileged part that verifies and emulates the critical operations should be located in the region protected by SelMon. The most important point is that the gate code should to be allocated in the memory region whose virtual and physical addresses are identically mapped to each other. This is to prevent the attacker from abusing the instruction that updates SCTLR. In spite of such requirements, the approach of the present exemplary embodiment is still more flexible than SKEE in that a particular memory address (e.g., 0x0) to be reserved for the security application is not required. The approach of the present exemplary embodiment helps reinforce the security of TrustZone by protecting the secure OS in the TEE as described above, but is not compatible with the monitor mode that generally serves as a gatekeeper of the TEE. Essentially, the reason is that the watchpoint exceptions are not supported in the monitor mode. As described in the privilege separation section, previous approaches are not suitable for the protection of the monitor mode as well. Hybridizing the trust anchor self-protection mechanism (SelMon) and the Software Fault Isolation (SFI) may be a reasonable approach to solve this problem. For example, the lack of watchpoint support, which enforces the non-accessibility, may be compensated by measuring read and write operations so as to enforce blocking access to the privileged region.

The specification for an ARM microcontroller (e.g., ARMv8-M) also defines debugging properties including watchpoints. However, to reproduce SelMon with this low-cost architecture, the current design is required to be modified due to the architectural distinction.

For example, the low-end specification does not support the MMU and DEP. Accordingly, the low-end specification is unable to use page tables to set permissions on components in each region and adjust DEP policies dynamically. Moreover, to reduce the cost in building resource-constrained devices, debug features should be removed from the devices in general. Using a Memory Protection Unit (MPU) together with compiler technology may be a solution capable of emulating such missing components. This will be further explored in order to implement SelMon on low-end devices. Meanwhile, x86 also provides hardware watchpoints. Unfortunately, the size of the possible monitoring range is limited. The size is limited to 8 bytes per individual watchpoint. Therefore, it is not suitable for implementing SelMon by using the watchpoints on x86. Instead, the memory protection key that enables memory regions to be partitioned into 16 parts and selectively disables (and enables) the access to each region may be a viable hardware feature for deploying SelMon to x86-based systems.

As described above, the apparatus for reinforcing the security of the trusted execution environment in the mobile device according to the present exemplary embodiment analyzed the existing approaches configured for the self-protection of the privileged software, and showed why such approaches are generally insufficient to be adopted in mobile devices. In addition, the apparatus according to the present exemplary embodiment demonstrated SelMon, which is the mechanism for protecting the privileged software in the ARM architecture by leveraging general hardware features such as the DEP and watchpoints. To demonstrate the effectiveness of the present approach, SelMon was applied to the thin hypervisor that monitors the OS kernel integrity. In the performance evaluation, SelMon imposed the overhead of approximately 30% in the hypervisor primitive operations. However, most of the overhead was obscured in SPEC CPU2006 due to the minimal portion of hypervisor invocation in the entire runtime of each test case. In the OS performance evaluation using Phoronix, the maximum overhead of 5% was observed.

The apparatus for reinforcing the security of the trusted execution environment in the mobile device according to the present exemplary embodiment ported SelMon in the hypervisor, but may similarly be adopted by other modes such as the secure and non-secure kernels because of the availability of the essential hardware features (e.g., the watchpoints) that highlight the portability of approaches.

The present disclosure described above is not limited by the above-described exemplary embodiment and the accompanying drawings, and obviously, those skilled in the art will appreciate that various substitutions, modifications, and changes are possible within the scope of the technical spirit of the present disclosure.

DESCRIPTION OF THE REFERENCE NUMERALS IN THE DRAWINGS

100: hypervisor
200: region switch unit
300: mode switch unit

The invention claimed is:

1. An apparatus for reinforcing security of a trusted execution environment in a mobile device, the apparatus comprising:
   a hypervisor configured to separate regions into a privileged region and a non-privileged region;
   a region switch configured to perform switching between the privileged region and the non-privileged region by controlling a watchpoint and memory execution area write protection; and
   a mode switch configured to perform switching between OS kernel mode and hypervisor mode by trapping by branch based on an exception occurrence privilege in order to protect vector integrity.

2. The apparatus of claim 1, wherein the privileged region protects a writable object such as a page table as privileged data, and separates an exception vector and privileged region code based on a granularity of page.

3. The apparatus of claim 1, wherein the non-privileged region emulates, for a monitored OS kernel, updates of a page table and a system register.

4. The apparatus of claim 1, wherein the region switch unit checks an OS request type in an exception vector, and performs the switching between the regions through a secure gate that configures the watchpoint and a memory execution area write protection flag in order to isolate the privileged region.

5. The apparatus of claim 1, wherein the region switch performs switching to the privileged region by using a hypercall captured by an exception vector upon receiving a request for updating a hypervisor page table while executing the non-privileged region.

6. The apparatus of claim 1, wherein, in the mode switch, a hypercall triggered in an OS kernel is trapped by branch due to an exception with a lower privilege, and
   all exceptions that occur in hypervisor mode execution are trapped by branch for a current privilege.

7. A method for reinforcing security of a trusted execution environment in a mobile device, the method comprising:
   invoking, from an OS kernel, a hypercall ported for OS kernel monitoring;
   in response to the invoking, trapping, by an exception vector in a privileged region, a hypercall exception;
   checking an OS request type to dispatch a handler in a non-privileged region and causing a region switch to occur from the privileged region to the non-privileged region; and
   performing switching between the privileged region and the non-privileged region through a secure gate that configures a watchpoint and a memory execution area write protection flag in order to isolate the privileged region.

* * * * *